United States Patent [19]

Kolenc et al.

[11] Patent Number: 4,606,374

[45] Date of Patent: Aug. 19, 1986

[54] VALVE

[75] Inventors: Terrence J. Kolenc, Eastlake; Carl R. Bork, Jr., Euclid; William C. Steiss, Parma; Earl D. Shufflebarger, Mentor; William P. Tobbe, Lyndhurst, all of Ohio

[73] Assignee: Nupro Company, Willoughby, Ohio

[21] Appl. No.: 482,218

[22] Filed: Apr. 5, 1983

[51] Int. Cl.$^4$ ............... F16K 37/00; F16K 51/00
[52] U.S. Cl. ............... 137/556.3; 251/284; 251/335.2; 116/208
[58] Field of Search ........... 251/335 A, 335 B, 333 R, 251/286, 287, 288, 284; 137/556, 556.3; 116/208

[56] References Cited

U.S. PATENT DOCUMENTS

| | | | |
|---|---|---|---|
| Re. 30,989 | 7/1982 | Bake et al. | 251/335.2 |
| 692,391 | 2/1902 | Wagner | 116/277 |
| 706,423 | 8/1902 | Kleinfeldt | 222/399 |
| 999,333 | 8/1911 | Patock | 251/229 |
| 1,103,917 | 7/1914 | Lawson | 116/277 |
| 1,108,146 | 8/1914 | Deegan | 92/101 |
| 1,118,649 | 11/1914 | Halter | 251/331 |
| 1,120,707 | 12/1914 | Froehlich | 251/331 |
| 1,128,426 | 2/1915 | Dunham | 251/269 |
| 1,148,805 | 8/1915 | Skiffington | 137/495 |
| 1,210,891 | 1/1917 | Blanchard et al. | 137/116.5 |
| 1,223,326 | 4/1917 | Marsh | 137/556 |
| 1,297,229 | 3/1919 | Ostrander | 166/277 |
| 1,310,954 | 7/1919 | Möller | 137/556 |
| 1,468,283 | 9/1923 | Coward | 137/556.6 |
| 1,485,792 | 3/1924 | McKay | 251/335 A |
| 1,497,275 | 6/1924 | Hench | 251/336 |
| 1,527,496 | 2/1925 | Tyrrell | 137/556.6 |
| 1,567,306 | 12/1925 | Straitz | 116/277 |
| 1,648,884 | 11/1927 | Giesler | 137/553 |
| 1,654,550 | 1/1928 | Muend | 137/360 |
| 1,662,291 | 3/1928 | Bastian | 251/274 |
| 1,703,531 | 2/1929 | Hyde | 137/494 |
| 1,719,801 | 7/1929 | Duffield | 251/286 |
| 1,749,774 | 3/1930 | McKay | 251/272 |
| 1,804,721 | 5/1931 | Valmore | 251/335 A |
| 1,806,462 | 5/1931 | Hopkins | 251/323 |
| 1,843,068 | 1/1932 | Wangenheim et al. | 137/510 |
| 1,890,505 | 12/1932 | Forbes | 251/335 A |
| 1,895,591 | 1/1933 | Spencer | 74/100 P |
| 1,910,491 | 5/1933 | Lynn | 251/268 |
| 1,920,659 | 8/1933 | Naylon | 116/208 |
| 1,976,851 | 10/1934 | Landis | 251/262 |
| 2,051,350 | 8/1936 | Smith | 251/335 A |
| 2,061,028 | 11/1936 | Forbes et al. | 251/335 A |
| 2,061,028 | 11/1936 | Forbes et al. | 251/31 |
| 2,144,754 | 1/1939 | Forbes | 251/128 |
| 2,209,956 | 8/1940 | Chase et al. | 222/5 |
| 2,277,395 | 3/1942 | Franck | 251/278 |
| 2,382,235 | 8/1945 | Lamar | 251/335 A |
| 2,460,168 | 1/1949 | Caserta | 264/135 |
| 2,485,942 | 10/1949 | Turner | 116/277 |
| 2,514,025 | 7/1950 | Bush | 137/556.6 |
| 2,642,255 | 6/1953 | Lindgren | 251/330 |
| 2,667,786 | 2/1954 | Spaulding | 73/724 |
| 2,679,760 | 6/1954 | Harland et al. | 73/706 |
| 2,697,581 | 12/1954 | Ray | 92/102 |
| 2,715,009 | 8/1955 | Beekley | 251/61.3 |
| 2,933,284 | 4/1960 | Yocum | 251/278 |
| 3,001,541 | 9/1961 | St. Clair | 137/113 |
| 3,040,773 | 6/1962 | McInerney | 137/556.3 |
| 3,089,505 | 5/1963 | Forster | 137/270 |
| 3,093,086 | 6/1963 | Altoz et al. | 92/102 |
| 3,129,009 | 4/1964 | Simpson | 277/2 |
| 3,260,530 | 7/1966 | Jelatis et al. | 277/2 |
| 3,322,142 | 5/1967 | Baumann | 137/334 |
| 3,351,088 | 11/1967 | Jensen | 137/517 |
| 3,396,940 | 8/1968 | Jones | 251/335 R |
| 3,428,291 | 2/1969 | Callahan, Jr. et al. | 251/122 |
| 3,438,351 | 4/1969 | Kirkwood | 116/208 |
| 3,482,596 | 12/1969 | Jones | 137/556 |
| 3,585,328 | 6/1971 | Fiore et al. | 92/103 M |
| 3,791,405 | 2/1974 | Brakebill et al. | 137/556.6 |
| 3,982,729 | 9/1976 | Tricini | 251/214 |
| 3,995,723 | 12/1976 | Holcomb, Jr. | 92/98 D |
| 4,029,296 | 6/1977 | Hartmann et al. | 251/331 |
| 4,044,998 | 8/1977 | Giese | 251/335 R |
| 4,051,865 | 10/1977 | Cocking et al. | 137/556 |
| 4,089,347 | 5/1978 | Christo | 251/288 |
| 4,136,709 | 1/1979 | Rogers et al. | 116/208 |
| 4,171,792 | 10/1979 | Bass | 251/335 A |
| 4,199,850 | 4/1980 | Velan | 251/335 A |
| 4,199,850 | 4/1980 | Velan | 29/157.1 R |
| 4,295,653 | 10/1981 | Coles | 277/2 |
| 4,304,260 | 12/1981 | Turner et al. | 137/613 |
| 4,354,666 | 10/1982 | McHale | 251/335.2 |

FOREIGN PATENT DOCUMENTS

| 1076458 | 2/1960 | Fed. Rep. of Germany . |
| 780169 | 1/1935 | France . |
| 1177123 | 12/1958 | France . |
| 773533 | 4/1957 | United Kingdom . |
| 1012101 | 12/1965 | United Kingdom . |

Primary Examiner—A. Michael Chambers
Attorney, Agent, or Firm—Fay, Sharpe, Fagan, Minnich & McKee

[57] ABSTRACT

A valve including indicating means for indicating overtravel of an operating member beyond its normally closed position for warning that replacement of a seal is necessary. A diaphragm valve has a diaphragm of a material which withstands repeated flexing and is clamped in a unique manner.

15 Claims, 9 Drawing Figures

VALVE

BACKGROUND OF THE INVENTION

This application relates to the art of valves and, more particularly, to valves having means for indicating various operating conditions thereof, and to diaphragm valves of the type having a diaphragm clamped between body and bonnet members. Although the invention will be described with particular reference to diaphragm valves and rotatably operable valve members, it will be appreciated that the invention has broader applications, and that certain individual features thereof may be used with other types of valves and/or in other environments.

Diaphragm valves of known types include a circular diaphragm clamped in a circumferential area between body and bonnet members. The diaphragm fails after a certain number of cycles and may also fail due to the manner in which it is clamped. It has been considered desirable to develop a diaphragm valve which included a diaphragm of increased strength capable of withstanding a greater number of cycles before failure. Such a valve would include means for clamping the diaphragm in a manner insuring good diaphragm sealing while minimizing stress failures.

Valves commonly include indicating means for indicating various flow positions of the valve member. In many applications where metal seal packless valves are used, indication of flow position is critical from a safety standpoint. In previous arrangements, indication of flow position was designated by a simple marking or required the operator to recognize handle orientation relative to the valve body. In the latter case, some types of mountings prohibit this type of recognition.

In previous arrangements, the rotatable operating member is restricted from being moved beyond the set, off position of the valve. If overtravel beyond the off position without adjustment of the valve is not possible, two problems will result after seal wear has occurred. First, the valve cannot be shut off, and second, the handle could be broken by an operator attempting to forcedly close the valve.

When there is no stop means for stopping the operating member in its off position, the operating member may inherently overtravel beyond the off position due to seal wear. Only a highly skilled person would be aware that at some point such overtravel would signify that replacement of the seal was necessary, and there was no associated means for indicating the point at which such seal replacement was necessary. Therefore, it would be desirable to have an alarming indicating means for clearly indicating to an operator that a seal is worn beyond its normal, useful life and that replacement is necessary.

The subject invention meets the foregoing needs and others, and provides a new and improved valve construction.

SUMMARY OF THE INVENTION

A diaphragm valve of the type described includes a circular diaphragm of austenitic stainless steel having a hardness not less than 38 on the Rockwell C scale. The austenitic stainless steel is preferably of AISI type 316.

In accordance with the present application, the diaphragm is axially clamped in a circumferential area inwardly of its outer periphery between opposed flat and parallel clamping surfaces. It has been found that diaphragm discs normally have a burr on the outer peripheral edge thereof due to stamping of same from a sheet. When attempts are made to clamp the outer periphery of the diaphragm between opposed surfaces, the burr prevents high pressure squeezing on mating flat surfaces of the diaphragm.

In a preferred arrangement, the diaphragm is clamped in axially and radially spaced circumferential areas connected with one another by an axially bent diaphragm portion. The maximum squeeze or clamping force is applied to the diaphragm at the inner circumferential area and the diaphragm is bent across relatively sharp corners.

The diaphragm is clamped between body and bonnet members, one of which includes an axially extending outer circumferential flange for protecting the clamping surface of the member on which it is provided. The other member includes a circumferential recess opposite from the circumferential flange for accommodating the outer periphery of the diaphragm in free and unclamped relationship.

The diaphragm valve includes a valve member on one side of the diaphragm having a non-circular head slidably guided in a cylindrical bore. The non-circular arrangement of the enlarged head is such that fluid flow can occur therepast for purging. The valve member includes a cylindrical stem axially guided in the bore through a guide washer having a non-circular inner surface to accommodate fluid flow therepast for purging purposes.

The diaphragm valve constructed in accordance with the present application can be actuated in a plurality of manners, including manual and remote actuating means. The arrangement specifically shown in the present application includes a manually operated rotatable operating member. However, it will be appreciated that the manually rotatable operating member of the present application is not required for operating the diaphragm valve, and that it can be used with valves of other types.

The invention also relates to a valve which includes a bonnet having a rotatable operating member for moving a valve member between open and closed positions. The valve member carries a wearable seal cooperable with a valve seat in the valve member closed position. The valve member is rotatable between open and closed positions, and the closed position includes angular ranges over which the seal is effective. One range includes a normal angular range over which the seal is in satisfactory condition, and a second range includes an overtravel or abnormal angular range over which the seal is still functional but should be replaced.

In accordance with the present application, indicating means is provided between the valve operating member and the valve bonnet for indicating overtravel of the operating member beyond the normal closed position thereof to indicate that replacement of the seal is necessary.

In a preferred arrangement, the indicating means of the present application includes means for indicating a range of normal angular closed positions and a range of abnormal closed angular positions for the operating member. When the operating member overtravels beyond the normal closed position, the operator will be readily aware that replacement of the seal is necessary.

In a preferred arrangement, the indicia for indicating overtravel of the operating member takes the form of adjacent arcuate bands of different color on the bonnet for cooperation with an indicator on the operating member. When the seal is satisfactory, the indicator on the operating member is aligned with the color band indicating normal valve closure. When the seal is worn and requires replacement, the indicator on the operating member is aligned with the color band indicating overtravel or that replacement of the seal is required.

In one arrangement, the indicating means includes an indicating ring member mounted on the valve bonnet beneath the operating member. Specifically, the indicating ring member is mounted on an outer cylindrical end portion of the valve bonnet, and is held thereto by frictional engagement. The indicating ring member includes a central opening or hole receiving an outer cylindrical end portion of the valve bonnet, and has axially extending flange means surrounding the opening for frictionally gripping the outer end portion of the valve bonnet.

Locating means is provided between the locating ring member and the valve bonnet for locating the ring member in a desired rotated position for locating the indicia thereon at the desired angular location. The locating means may take many forms and, in one arrangement, includes a longitudinal groove in the outer end portion of the bonnet receiving an inwardly extending tab on the indicating ring member. The tab on the indicating ring member is located a predetermined distance from the indicia thereon, and the groove in the bonnet is located a predetermined distance from a stop surface which normally cooperates with a stop projection on the operating member to stop same in the valve open position.

The indicating ring member includes an inclined surface having the indicia thereon and being visible in directions both parallel and perpendicular to the longitudinal axis of the operating member. The indicating ring member also includes an outer flange for concealing a panel mounting nut threaded on the bonnet.

The principal object of the present invention is the provision of an improved diaphragm valve which is very economical to manufacture and assemble, and very reliable in operation.

Another advantage of the invention is the provision of an improved diaphragm valve having an improved diaphragm material.

A further advantage is the provision of an improved diaphragm valve having an improved arrangement for circumferentially clamping the diaphragm.

Another advantage resides in the provision of an improved diaphragm valve having an axially movable valve member with cooperating hexagonal and circular guide surfaces for allowing purging.

Still another advantage of the invention is found in the provision of a valve having a rotatable operating member and including indicating means for indicating operating member overtravel which requires replacement of a valve seal.

A further advantage of the invention is the provision of indicating means for indicating various positions of a rotatable operating member.

Yet a further advantage is the provision of an improved ring member secured to a valve bonnet in a unique manner for performing diverse functions such as concealing a panel mounting nut or providing indicating positions for the valve operating member.

Other advantages and benefits of the invention will become apparent to those skilled in the art upon a reading and understanding of the following detailed description.

DESCRIPTION OF PREFERRED EMBODIMENTS

The invention may take form in certain parts and arrangements of parts, preferred embodiments of which will be described in detail and illustrated in the accompanying drawings which form a part hereof and wherein.

DESCRIPTION OF PREFERRED EMBODIMENTS

Figure 1:
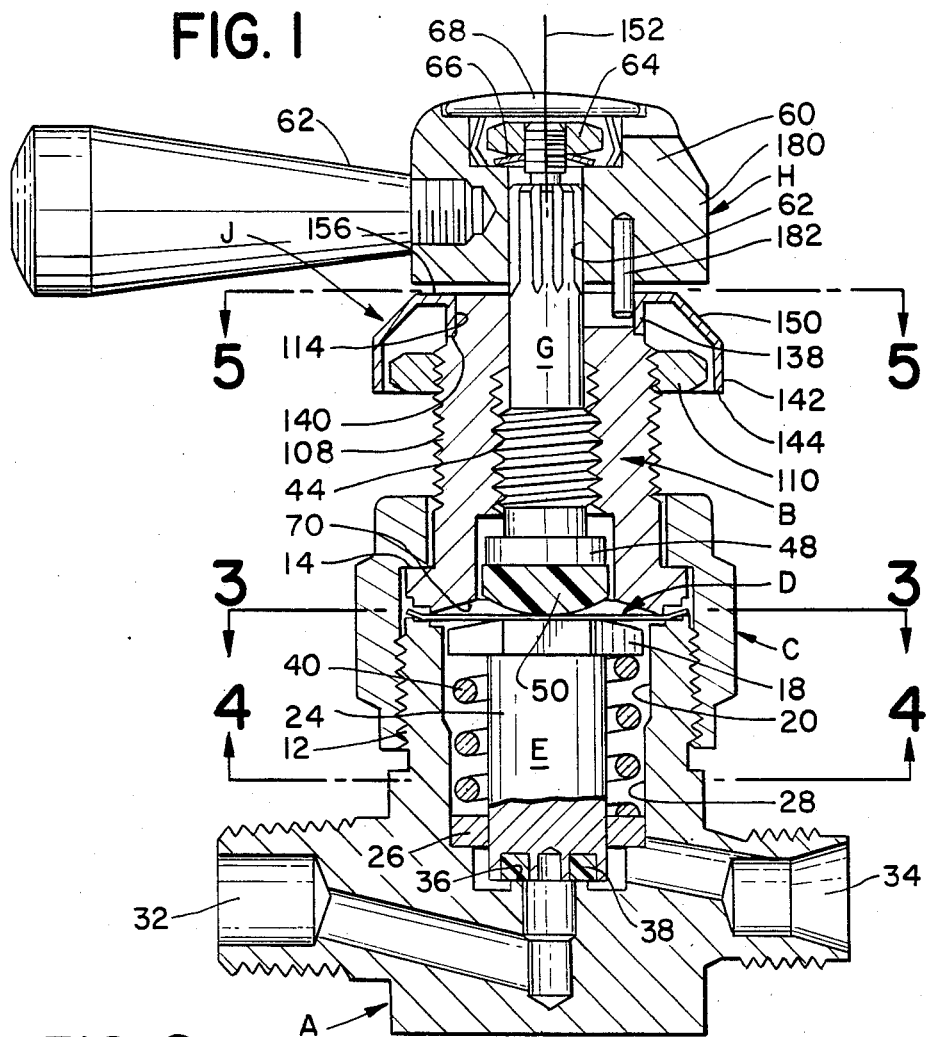
FIG. 1 is a cross-sectional elevational view of an improved valve having the features of the present invention incorporated therein.

Referring now to the drawings, wherein the showings are for purposes of illustrating certain preferred embodiments of the invention only and not for purposes of limiting same, FIG. 1 shows a valve body A and a valve bonnet B axially clamped together by a bonnet nut C in a known manner, and having a circular metal diaphragm D circumferentially clamped therebetween. Valve body A and bonnet nut C have cooperating threads therebetween generally indicated at numeral 12 for providing axial movement of bonnet nut C relative to body A upon rotational movement of bonnet nut C. Bonnet member B and bonnet nut C have cooperating generally radial shoulders 14 which abut one another for moving bonnet member B toward a body member A upon rotation of bonnet nut C in the appropriate direction to securely clamp diaphragm D therebetween.

An axially movable valve member E has an enlarged head portion 18 slidably guided in a large diameter portion of a cylindrical bore 20. The outer end portion of enlarged head 18 facing toward diaphragm D is generally spherical and the outer periphery of enlarged head portion 18 is generally hexagonal so that only the corners thereof are guided in the cylindrical bore 20, while the flats thereof provide fluid passages to accommodate valve purging. A cylindrical stem portion 24 of valve member E is slidably guided through a guide washer 26 having a cylindrical outer surface closely received in a cylindrical small diameter bore portion 28, and having a hexagonal inner surface to provide passages to accommodate purging.

Inlet and outlet ports 32,34 in valve body A communicate with the valve body bore on opposite sides of a circumferential upstanding seat 36. Fluid inlet and outlet lines (not shown) may be connected to inlet and outlet 32,34, respectively, by convenient known means. A plastic, elastomeric or metal circumferential seal ring 38 is secured to an end portion of valve member E for selectve cooperation with seat 36 to prevent or allow fluid flow through the valve. In the "standard" version of the subject new valve, seal ring 38 is constructed from polytetrafluoroethylene.

Seal 38 is attached to valve member E in the manner disclosed in U.S. Pat. No. 3,623,699 issued Nov. 30, 1971, to Matousek, et al., the disclosure of which is hereby incorporated herein by reference. Briefly, the end portion of valve member E includes a circumferential recess receiving seal ring 38, and inner and outer rims on valve member E are deformed toward one another over the outer end face of the seal ring for holding same in position. This seal arrangement limits cold flow of the seal material which produces better control of the stroke of the valve. This consequently yields better control of diaphragm life which is related to stroke.

A coil spring 40 under compression between guide washer 26 and enlarged head 18 normally urges the valve member E, i.e., seal ring 38, away from seat 36 to provide fluid communication between inlet 32 and outlet 34. In the open position of valve member E, fluid enters the entire cylindrical bore defined by large and small diameter portions 20,28. Upon closing of valve member E by movement of seal 38 back into engagement with seat 36, purging of fluid pressure within the bore is possible because of the hexagonal shape of enlarged head 18 and of the interior surface of guide washer 26.

Bonnet B includes a stem G rotatably guided therein. Cooperating external and internal threads between stem member G and bonnet member B are generally indicated by numeral 44 to impart axial movement to stem member G upon rotational movement thereof relative to the bonnet. Instead of using threads, it will be recognized that many different axial operators can be provided for imparting axial movement to valve member E to effect movement between its open and closed positions, and that the manually operated rotatable operating member shown is only illustrative. An enlarged head 48 on valve stem G has a flat surface engaging a corresponding flat surface on a button 50 which, in turn, has a convex surface engaging diaphragm D on the opposite side thereof from enlarged head 18 of valve member E. The stem head and button are cooperatively mounted so as to facilitate relative rotation therebetween around the longitudinal axis of the stem. Button 50 may be of plastic or other suitable materials, and the interface between stem head 48 and the button is lubricated to assist allowing relative rotation between the stem and button instead of having the button rotate relative to diaphragm D.

A rotatable operating member generally indicated at H is provided for moving valve member E between its open and closed positions. Enlarged head 60 is splined onto stem G as at 62 for preventing relative rotation between the head and stem. An operating handle 62 is suitably connected to head 60, and may even be integral therewith. A nut 64 and lock washer 66 secure head 60 to stem G, and a cover plate 68 snaps into a circular recess in the top of head 60 in a known manner. It will be recognized that valve operating member H includes head 60, handle 62, and stem G, and that operating member H is rotatable for moving valve member E axially between its open and closed positions. However, it will be appreciated that other operators may be provided if so desired for cooperating with diaphragm D to move the valve member between its open and closed positions.

Figure 2:
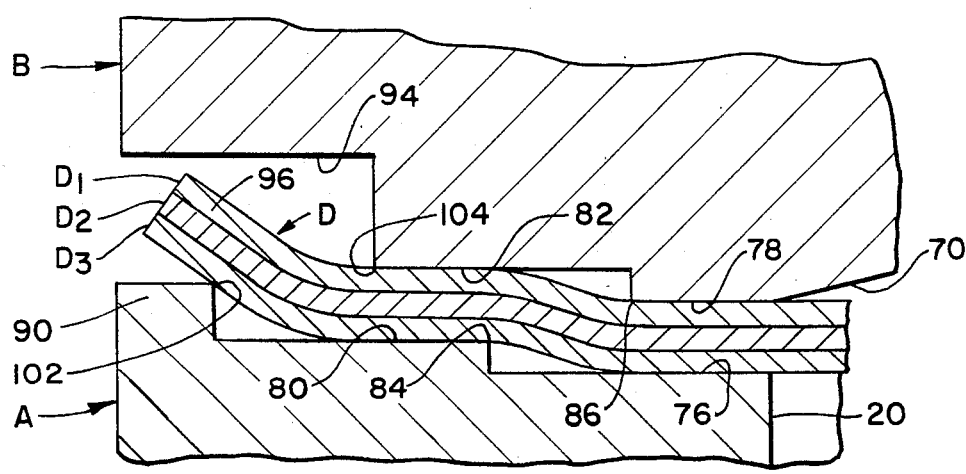
FIG. 2 is an enlarged partial cross-sectional elevational view of a peripheral edge portion of the diaphragm in the valve of FIG. 1 showing the specific arrangement of the diaphragm and the clamping surfaces between the valve body and valve bonnet.

FIG. 2 shows an enlarged peripheral edge portion of body A and bonnet B having diaphragm D axially clamped therebetween. As shown in FIG. 1, bonnet member B has a generally conical surface portion 70 extending away from diaphragm D opposite from large diameter cylindrical bore portion 20 in the valve body. Conical portion 70 and cylindrical bore portion 20 are also generally shown in FIG. 2 for reference purposes. Body member A and bonnet member B have spaced-apart opposite flat and parallel circumferential areas 76,78 between which an inner or primary circumferential area of diaphragm D is axially clamped over an inner circumferential area. Tightening of bonnet nut C in FIG. 1 moves clamping surfaces 76,78 toward one another for squeezing diaphragm D therebetween. As will be noted in FIG. 2, the circumferential area clamped between clamping surfaces 76,78 is spaced well inwardly from the diaphragm outer periphery.

Body member A and bonnet member B also include secondary flat and parallel clamping surfaces 80,82 spaced axially and radially from primary clamping surfaces 76,78. Primary surfaces 76,78 are separated from secondary surfaces 80,82 by relatvely sharp corners 84,86 across which diaphragm D is bent axially as clearly shown in FIG. 2. The axial spacing between corners 84,86 is less than the normal axial thickness of diaphragm D and less than the axial spacing between clamping surfaces 76,78. As a result, corners 84,86 provide excellent seals against the opposite face surfaces of the diaphragm. Flat and parallel circumferential surfaces 80,82 are spaced-apart from one another no less than, and preferably slightly greater than, the spacing between primary clamping surfaces 76,78. The machining tolerances for body member A and bonnet member B are chosen such that the spacing between surfaces 76,78 will always provide maximum squeeze or clamping action as compared to the amount of squeeze or clamping action between surfaces 80,82. Such action insures that primary diaphragm sealing occurs at areas 76,78 to better accommodate valve purging.

Continuing with reference to FIG. 2, an outer circumferential flange 90 extends axially from secondary clamping surface 80 on body member A for protecting inner or primary clamping surface 76 against knicks and other damage during processing and assembly of the valve. The axial projection of flange 90 is substantially greater than the axial spacing between primary and secondary surfaces 76,80. Directly opposite from protective flange 90, bonnet member B is provided with an enlarged recess 94 for receiving a terminal end portion 96 of diaphragm D in a free and unclamped condition. Secondary corners generally indicated as 102,104 are axially spaced from one another a distance substantially less than the axial spacing between corners 84,86 so that the outer end portion 96 of diaphragm D is axially deformed to a greater degree than the axial deformation thereof between corners 84,86.

As a result of the foregoing relationships, opposed pairs of flat clamping surfaces 76,78 and 80,82 define axially and radially spaced clamping surfaces for axially clamping diaphragm D at radially-spaced circumferential areas. Between the inner and outer circumferential clamping areas, diaphragm D is axially bent between corners 84,86.

Diaphragm D is shown as comprising three discs or layers D1, D2, and D3 of equal thickness, although a greater or lesser number of such discs could be suitably employed in some instances. It has been found that such an arrangement provides enhanced flexibility without substantially reducing the strength or life of the composite diaphragm construction. In the preferred arrangement, each disc diaphragm forming disc comprises a flat circular member of austenitic type 316 stainless steel heat treated to a hardness of not less than 38 on the Rockwell C scale. Such hardness is considered to be a "fully hardened" condition for the particular material involved, and effectively enhances the overall cycle life of diaphragm D. Normally, stainless steel diaphragms are constructed from material having a hardness of approximately 27 on the Rockwell C scale, i.e., "quarter hard". It has been found that an increase in diaphragm hardness increases its strength which, in turn, increases its cycle life in a generally linear relationship. Thus, an increase in hardness from approximately 27 to approximately 38 on the Rockwell C scale increases the diaphragm cycle life by a factor of about two. This result indeed comprises a significant improvement over prior art stainless steel diaphragm constructions. While 316 stainless steel is employed in the preferred construction, it will be appreciated that other materials and hardness relationships could be used for different types of service.

Typically, discs D1, D2, and D3 are stamped from sheet form and thus include a burr around the outer periphery thereof. The improved arrangement of the present invention, however, securely clamps the diaphragm at circumferential areas spaced radially inward from the outer periphery, so any burrs cannot possibly interfere with obtaining secure clamping and sealing. Discs D1, D2, and D3 are physically separate and are not bonded together in any way. The discs are held together simply by the clamping force exerted between the valve body and bonnet as described above. The laminated or layered diaphragm construction requires less force to flex, but has a strength which is about as great as a single layer diaphragm having the same thickness as the combined thickness of discs D1, D2, and D3.

Figure 3:
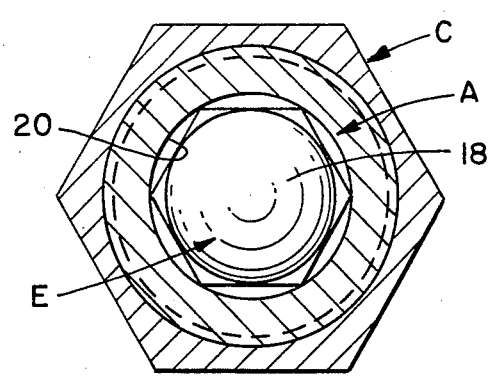
FIG. 3 is a partial cross-sectional elevational view showing the enlarged head of an axially movable valve member being guided in a cylindrical bore.
Figure 4:
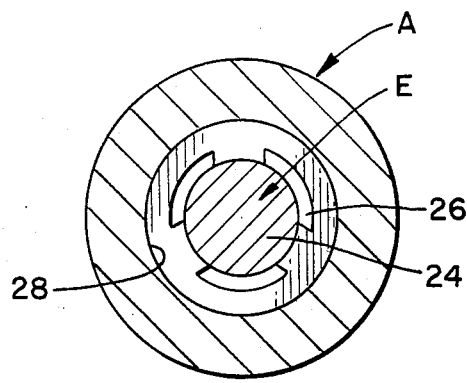
FIG. 4 is a cross-sectional elevational view taken generally along lines 4—4 of FIG. 1 showing a cylindrical portion of the valve member being axially guided through a non-circular opening in a guide washer received in a cylindrical bore.

FIG. 3 shows enlarged hexagonal head 18 on valve member E as having its corners axially guided in large diameter bore portion 20. The flat areas of the head are spaced from the wall of the bore to accommodate valve purging. FIG. 4 shows cylindrical stem portion 24 of valve member E as being axially guided by flats defined by the internal hexagonal opening in guide washer 26. Spaces are advantageously defined between cylindrical stem 24 and the corners of the non-circular interior surface of washer 26 to facilitate purging.

Bonnet B is illustrated in FIG. 1 as including an external threaded portion 108 receiving a panel nut 110. Threaded portion 108 is closely receivable through an opening in a panel (not shown), and the panel is clamped between the panel nut 110 and bonnet nut C to securely mount the valve thereto. Shims may be provided on the underside of the panel against bonnet nut C for desired location of panel nut 110 adjacent the outer end portion of bonnet B when the valve is in a mounted position.

Figure 5:
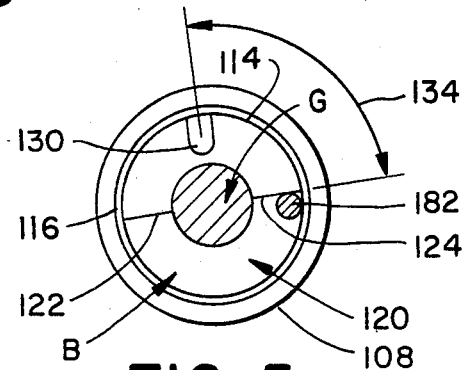
FIG. 5 is a partial cross-sectional view taken generally along lines 5—5 of FIG. 1 with the indicating ring member and panel nut removed for clarity of illustration in showing the top end portion of the valve bonnet.

As shown with primary reference to FIG. 5 and with secondary reference to FIG. 1, the outer end portion of bonnet B includes a generally cylindrical surface 114 spaced radially inward from threaded portion 108 and separated therefrom by a circumferential radial shoulder 116. Cylindrical end portion 114 is cut-away as generally indicated at 120 over an axial extent less than the distance from its outer terminal end to shoulder 116. Cut-away portion 120 has opposite axially extending end surfaces 122,124, and the axial bottom of cut-away portion 120 is axially spaced slightly from radial shoulder 116 so that a substantially complete circumferential surface still exists around the outer end portion of the bonnet. End surfaces 122,124 may be angularly spaced from one another substantially greater than 90° and less than 180°.

At least one end surface, i.e., end surface 124 defines a stop surface for stopping rotation of operating member H in its open position. A locating means in the form of an axial groove 130 is provided in the outer end portion of bonnet B. Groove 130 is angularly spaced approximately 90° from stop surface 124 as generally indicated by angle 134, and is used for purposes to be described.

With continued reference to FIGS. 1 and 5, an indicating ring member J has a central opening or hole therethrough and is frictionally received on outer cylindrical end portion 114 of stem B. The central opening or hole includes generally axially extending flange means 138 for frictionally gripping bonnet outer cylindrical portion 114. It will be recognized that axially extending inner flange means 138 may be circumferentially continuous or may comprise a plurality of circumferentially-spaced flanges for frictionally or resiliently gripping the bonnet outer cylindrical portion.

Inner flange 138 includes a terminal end 140 which normally abuts shoulder 116 (FIG. 5). Ring member J includes a generally axially extending outer circumferential flange 142 having a terminal end 144 axially spaced a substantial distance away from the terminal end 140 of inner flange means 138. Outer flange 142 surrounds, covers, and conceals panel nut 110 when the valve is mounted to a panel. A circumferential inclined surface 150 extends from outer flange 142 toward the central opening in the ring member. In the arrangement shown, inclined surface 150 is inclined at an angle of approximately 45° to longitudinal axis 152 of bonnet B, stem G and operating member H. A small circumferential horizontal portion 156 extends between inclined surface 150 and the central opening in ring member J. Inclined surface 150 is located relative to head 60 and positioned such that it is visible in directions both parallel and perpendicular to longitudinal axis 152.

Figure 6:
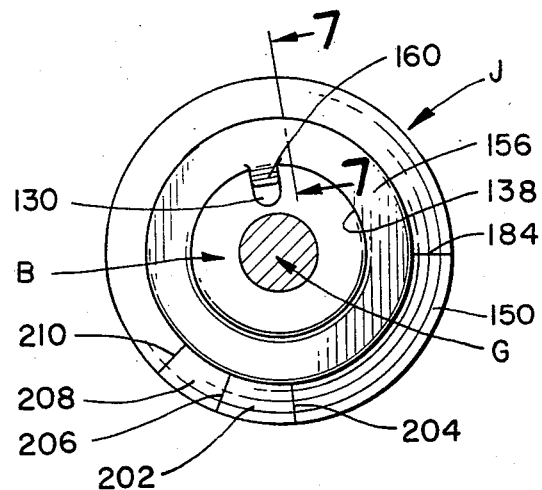
FIG. 6 is a view similar to FIG. 5 for showing a tab on the indicating ring member cooperating with a longitudinal groove in the valve bonnet to prevent relative rotation therebetween.

As shown in FIG. 6, axially extending inner flange 138 on ring member J includes a radially inward extending tab 160 for close reception in groove 130 of bonnet member B. Tab 160 may take many forms, including an inclined inwardly extending portion of flange 138, or a perpendicularly extending tab from the bottom edge of the flange. Groove 130 and tab 160 cooperate with one another to properly locate indicating ring member J relative to bonnet B for positioning certain indicia on ring member J in the proper location.

Figure 7:
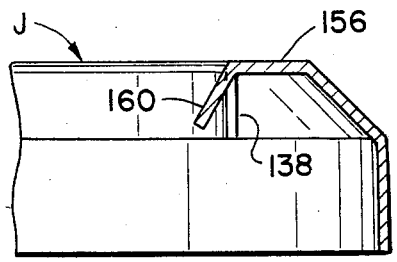
FIG. 7 is a side elevational cross-sectional view taken generally along lines 7—7 of FIG. 6.
Figure 8:
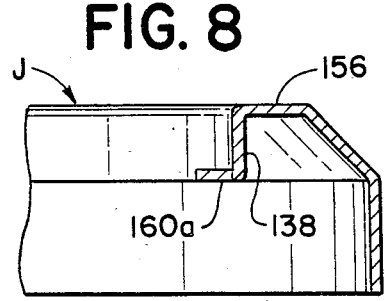
FIG. 8 is a view similar to FIG. 7 for showing an alternative arrangement.

As shown in FIG. 7, tab 160 is shown as simply comprising an inwardly inclined slit portion from circumferential flange 138. FIG. 8 shows tab 160a as comprising a generally radially inward extending extension from the bottom end of inner flange 138.

Figure 9:
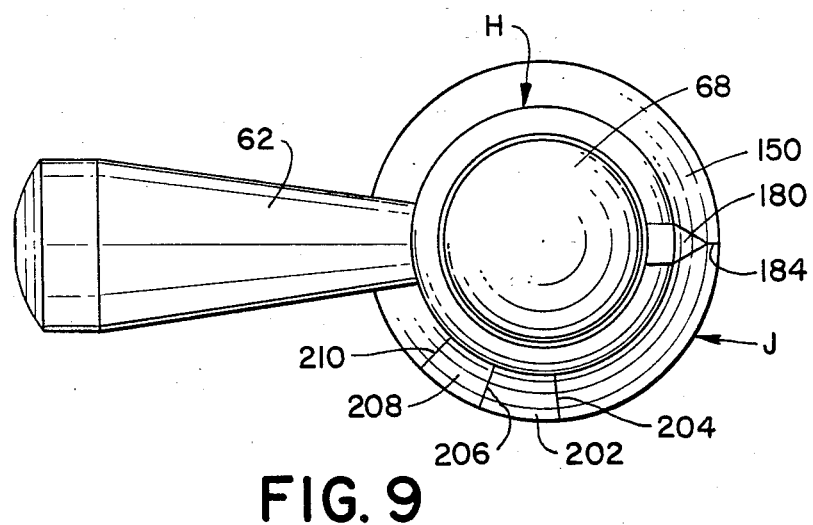
FIG. 9 is a plan view of the valve handle shown in FIG. 1.

Referring to FIGS. 1 and 9, operating means H includes a pointer or indicator means 180 and a stop pin 182. Upon rotation of operating member H to its full open position, pointer or indicator means 180 will be aligned with an indicator line 184 on inclined surface 150 of indicating ring member J. In this position, stop pin 182 carried by head 60 will engage stop surface 124 (FIG. 5) for stopping rotation of the valve operating member in its full open position. In this position, coil spring 40 moves valve member E axially upward in the view of FIG. 1 to its full open position wherein seal 38 is axially displaced from seat 36.

When the valve is closed, handle 62, i.e., operating member H, is rotated clockwise in the view of FIG. 9 until pointer 180 is located in a closed normal angular range 202. This range is defined between radial lines 204,206 arcuately spaced apart from each other by an angle of approximately 27.5°, with line 204 being located slightly less than 90° from line 184 and line 206 being located greater than 90° therefrom. An abnormal angular range generally indicated by numeral 208 extends between radial lines 206,210 over an angle of approximately 22.5° adjacent range 202. In the preferred arrangement, area 202 is colored green between lines 204,206 to provide an arcuate band of one color for indicating a normal closed position for the valve when pointer 180 is aligned therewith. When seal 38 is unduly worn so that replacement thereof is or soon may be necessary, pointer 180 will overtravel beyond normal closed range 202 into abnormal angular range 208. Range 208 is colored red for indicating and alarming an operator that replacement of seal 38 is necessary. In the event seal 38 is substantially worn and a replacement seal is not immediately available, it is possible to temporarily readjust operating member H on stem G for permitting the seal to sealingly engage seat 36 in the valve closed condition.

Cut-out end surface 122 (FIG. 5) is angularly spaced well beyond warning band 208 so that stop pin 182 (FIG. 1) on operating member H will not engage surface 122, even though pointer 180 is approaching travel beyond warning area 208. Adjacent contrasting color bands 202,208 are located on inclined surface 150 so they are readily visible in directions both parallel and perpendicular to longitudinal axis 152.

It will be recognized that valve open position indicia 184 on ring member J has a predetermined angular relationship with locating means 160 and with indicating means 202,208. This relationship is such that assembly or disassembly of the valve always insures that indicating ring member J is installed in proper position because of the necessary alignment of locating means 130,160. This properly locates color bands 202,208 in the closed position of the valve member with respect to a rotatable valve operating member.

It will also be recognized that the improved arrangement of the present application provides cooperating indicating means between operating member H and bonnet B for indicating overtravel of operating member H in its closed position to thereby indicate that replacement of seal 38 is required. In the arrangement shown and described, the indicating means takes the form of an indicator 180 on operating member H and indicating bands 202,208 on an indicating ring member J attached to bonnet B. However, it will be recognized that many other arrangements are possible without departing from the overall intent or scope of the invention. Furthermore, instead of merely indicating open and overtravel positions of an operating member, it will be appreciated that indicating ring member J can be used for many other purposes, including concealment of panel nut 110 and the performance of other indicating functions having appropriate indicia thereon.

The improved indicia arrangement of the present application indicates the open position of the valve, a normal angular range of closed positions, and an abnormal range of closed positions. Thus, the user of the valve can readily determine visually whether the valve is open, closed, or that the seal requires replacement. The simplified manner of attaching the indicator ring member to the valve bonnet makes it possible to easily remove and replace the valve, or to renew its components. The indicating ring member accommodates this capability by having locating means defined by cooperating groove 130 and tab 160 for properly positioning ring member J with its indicating bands 202,208 in the desired circumferential location.

Although the invention has been shown and described with respect to certain preferred embodiments, modifications and alterations will occur to others skilled in the art upon a reading and understanding of this specification. It is intended to include all such modifications and alterations insofar as they come within the scope of the claims or the equivalents thereof.

Having thus described the invention, it is now claimed:

1. A valve bonnet having a cylindrical outer end portion, said outer end portion being circumferentially cut-away over an arc greater than 90° and less than 180° to define a cut-away portion having opposite end surfaces at least one of which defines a stop for cooperation with a stop projection on a valve operating member, said cut-away portion having a bottom, an outwardly extending circumferential shoulder on said bonnet end portion axially-spaced from said bottom of said cut-away portion, and said outer end portion including a continuous outer cylindrical portion between said bottom of said cut-away portion and said shoulder.

2. The valve bonnet as defined in claim 1 including an axial groove in said outer end portion circumferentially-spaced from said cut-away portion.

3. The valve bonnet as defined in claim 2 wherein said groove is spaced a predetermined angular degree from said stop surface.

4. A valve including: a valve bonnet having a rotatable operating member for moving a valve member between open and closed positions, said valve member carrying a wearable seal cooperable with a valve seat in said closed position of said valve member; cooperating indicating means between said bonnet and operating member for indicating overtravel of said operating member in its closed position and thereby indicating that replacement of said seal is required, said indicating means including an indicating ring member associated with said bonnet, said bonnet having a cylindrical outer end portion and said indicating ring member having a generally cylindrical inner flange received on said cylindrical outer end portion in frictional gripping relationship therewith; cooperating abutment means between said bonnet and indicating ring member for preventing relative rotation therebetween; and, said abutment means including a longitudinal groove in said outer end portion of said bonnet and an inwardly extending tab on said inner flange of said indicating ring member received in said groove.

5. A valve including: a valve bonnet having a rotatable operating member for moving a valve member between open and closed positions, said valve member carrying a wearable seal cooperable with a valve seat in said closed position of said valve member; cooperating indicating means between said bonnet and operating member for indicating overtravel of said operating member in its closed position and thereby indicating that replacement of said seal is required, said indicating means including an indicating ring member mounted on said bonnet and having overtravel indicia thereon for indicating said overtravel of said operating member; and, cooperating locating means between said bonnet and indicating ring member for locating said ring member with said overtravel indicia thereon in its proper circumferential position.

6. The valve as defined in claim 5 wherein said bonnet and operating member having cooperating stop means for stopping rotation of said operating member in said open position thereof, and said locating means providing location of said ring member with said overtravel indicia angularly spaced a predetermined degree from said stop means on said bonnet toward said closed position of said operating member.

7. The valve as defined in claim 6 wherein said locating means comprises a longitudinal groove in said bonnet and an inwardly extending tab on said ring member received in said groove.

8. A valve including: a valve bonnet having a rotatable operating member for moving a valve member between open and closed positions, said valve member carrying a wearable seal cooperable with a valve seat in said closed position of said valve member; cooperating indicating means between said bonnet and operating member for indicating overtravel of said operating member in its closed position and thereby indicating that replacement of said seal is required, said bonnet having a longitudinal axis and said indicating means including an indicator ring member mounted on said bonnet around said axis; and, said ring member having an outer circumferential inclined surface visible in directions both parallel and perpendicular to said axis, and overtravel indicia on said inclined surface for indicating said overtravel of said operating member.

9. A valve including: a valve bonnet having a rotatable operating member for moving a valve member between open and closed positions, said valve member having a wearable seal cooperable with a valve seat in said closed position of said valve member; cooperating indicating means between said operating member and bonnet for indicating positions of said valve member, said indicating means including an indicating ring member mounted on said bonnet and frictionally retained thereon, said bonnet having a cylindrical outer end portion and said ring member having a central hole receiving said end portion; and, flange means on said ring member around said hole frictionally gripping said end portion.

10. A valve including: a valve bonnet having a rotatable operating member for moving a valve member between open and closed positions, said valve member having a wearable seal cooperable with a valve seat in said closed position of said valve member; cooperating indicating means between said operating member and bonnet for indicating positions of said valve member, said indicating means including an indicating ring member mounted on said bonnet and frictionally retained thereon; and, a longitudinal groove in said bonnet and a tab on said ring member received in said groove.

11. A valve including: a valve bonnet having a rotatable operating member for moving a valve member between open and closed positions, said valve member having a wearable seal cooperable with a valve seat in said closed position of said valve member; cooperating indicating means between said operating member and bonnet for indicating positions of said valve member, said indicating means including an indicating ring member mounted on said bonnet and frictionally retained thereon, said bonnet having a longitudinal axis; and, said ring member including an outer circumferential inclined surface visible in directions both parallel and perpendicular to said axis with said indicia being on said inclined surface.

12. A valve including: a valve bonnet having a rotatable operating member for moving a valve member between open and closed positions, said bonnet having an externally threaded portion for receiving a panel nut and an outer cylindrical end portion; a ring member having a central hole receiving said cylindrical end portion; generally axially extending flange means on said ring member around said hole for gripping said cylindrical end portion; a generally axially extending outer flange on said ring member for surrounding and concealing a panel nut received on said threaded portion; said ring member having a circumferential inclined outer surface extending between said hole and said outer flange; an axial groove in said end portion of said bonnet; and, an inwardly extending tab on said ring member received in said groove.

13. A ring member for mounting on a valve bonnet and including: a central circular hole therethrough; generally axially extending inner flange means around said hole for gripping an outer end portion of a valve bonnet; a generally axially extending outer flange on said ring member and having an outer flange terminal end spaced axially a substantial distance from the terminal end of said inner flange means; a circumferential outer inclined surface extending between said hole and outer flange, said inclined surface being visible in directions both perpendicular and parallel to the longitudinal axis of said hole; and, said inner flange means including inwardly extending tab means for reception in a groove on a valve bonnet end portion to hold said ring member against rotation.

14. A ring member for mounting on a valve bonnet and including: a central circular hole therethrough; generally axially extending inner flange means around said hole for gripping an outer end portion of a valve bonnet; a generally axially extending outer flange on said ring member and having an outer flange terminal end spaced axially a substantially distance from the terminal end of said inner flange means; a circumferential outer inclined surface extending between said hole and outer flange, said inclined surface being visible in directions both perpendicular and parallel to the longitudinal axis of said hole; and indicia on said inclined surface for indicating a normal angular range for an operating member in its valve closed position and for indicating overtravel of such operating member in an abnormal angular range.

15. The ring member as defined in claim 14 wherein said indicia includes adjacent bands of different color.

* * * * *